United States Patent [19]
Grant et al.

[11] Patent Number: 5,454,533
[45] Date of Patent: Oct. 3, 1995

[54] ROBOT ARM AND METHOD OF ITS USE

[75] Inventors: Andris P. Grant, Toronto; Ian H. Rowe, North York, both of Canada

[73] Assignee: Spar Aerospace Limited, Brampton, Canada

[21] Appl. No.: 74,605

[22] Filed: Jun. 11, 1993

[51] Int. Cl.$^6$ ................................................. B64D 15/00
[52] U.S. Cl. .................................. 244/134 R; 244/134 C; 901/43
[58] Field of Search .......................... 244/134 R, 134 C; 414/239; 901/43, 15, 28; 134/45, 123

[56] References Cited

U.S. PATENT DOCUMENTS

| | | | |
|---|---|---|---|
| 3,439,372 | 4/1969 | Collier | 15/21.1 |
| 4,220,170 | 9/1980 | Herbert et al. | 901/43 |
| 4,239,431 | 12/1980 | Davini | 901/43 |
| 4,630,567 | 12/1986 | Bambousek et al. | 901/43 |
| 4,654,087 | 3/1987 | Fujita . | |
| 4,693,664 | 9/1987 | Schweiker | 901/43 |
| 5,104,068 | 4/1992 | Krilla et al. | 244/134 C |
| 5,138,904 | 8/1992 | Lande . | |

FOREIGN PATENT DOCUMENTS

| | | | |
|---|---|---|---|
| 0341134 | 11/1989 | European Pat. Off. | 244/134 C |
| 4034404 | 4/1992 | Germany . | |
| 2002142 | 2/1979 | United Kingdom | 901/43 |
| WO-A 9300261 | 1/1993 | WIPO . | |

OTHER PUBLICATIONS

Brochure entitled "Rational De–Icing, The Intelligent Solution".
A brochure entitled "Horizon 2000 Aircraft Deicing System" (undated).
A five page information letter entitled "FMW International, Inc. Horizon 2000 System" (undated).

*Primary Examiner*—Michael S. Huppert
*Assistant Examiner*—Anne E. Bidwell

[57] ABSTRACT

An aircraft servicing system comprises four robot arms mounted to the ground so as to form a lane with the base of two of the robot arms delineating one side of the lane and the base of the other two robots delineating the other side of the lane. The robot arms may assume a low position which allows an aircraft's wings to pass over the arms while the aircraft enters the lane between the arms. Thereafter, the arms may be moved so that a nozzle array at the end of each arm may de-ice or wash the aircraft. Subsequently, the arms may again assume a low position to allow the aircraft to leave the lane. Each robot arm has an elongated member connected to the base by a yaw joint, a first arm segment connected to the elongated member by a pitch joint, second arm segment connected to the first arm segment by a pitch joint, and a third arm segment connected to the second arm segment by a telescoping joint. This gives the arm the needed range of motion and provides one degree of redundancy so that the arm has some freedom of movement while the end effector is stationary in free-space. This allows the arm to be reconfigured as necessary, on a dynamic basis, so as to anticipate possible singularities and avoid these. The system has application for servicing other large structures, such as the hull of a dry docked ship.

9 Claims, 3 Drawing Sheets

ROBOT ARM AND METHOD OF ITS USE

BACKGROUND OF THE INVENTION

1. Field of the Invention

This invention relates to a robot arm and, in one aspect, a robot arm system, and method for its use, for servicing aircraft.

2. Description of the Related Art

The great majority of aircraft de-icing is accomplished with mobile boom trucks. An operator sits in a cab on a boom and has controls in order to position the boom appropriately so that the operator may spray an aircraft by way of nozzles which extend from the cab.

Aircraft safety would be enhanced if aircraft hold over time available subsequent to de-icing were increased. Furthermore, the glycol used in de-icing causes environmental concerns and the ability to recycle this glycol would be advantageous.

The present invention seeks to overcome drawbacks of known de-icing systems. More generally, the present invention seeks to provide a robot system for servicing large structures.

SUMMARY OF THE INVENTION

According to the present invention, there is provided an aircraft spraying system, comprising a plurality of robot arms, each having: a base mounted to the ground; a member mounted to said base by a yaw joint such that said member has an upstanding axis of rotation; a first arm segment joined to said member by a first pitch joint; a second arm segment joined to said first arm segment by a second pitch joint; a third arm segment joined to said second arm segment by a telescopic joint; a nozzled end effector joined to said third arm segment; said first pitch joint and said second pitch joint having angular ranges sufficient to allow said first arm segment, said second arm segment, said third arm segment, and said end effector to be positioned such that a wing of an aircraft to be sprayed may pass over said first arm segment, said second arm segment, said third arm segment, and said end effector; whereby said first pitch joint, said second pitch joint, and said telescopic joint provide one degree of redundancy such that, at least for some orientations of said robot arm, said end effector may be maintained at a point in space while said first arm segment, said second arm segment, and said third arm segment move; the base of each of said plurality of robot arms mounted to the ground in spaced relation from one another so as to provide an aircraft lane therebetween for permitting passage of aircraft with at least one base positioned to one side of said lane and at least one base positioned to another side of said lane, said lane having a width which is greater than any wheel span and engine span of an aircraft with which said system is designed for use and narrower than a wing span of an aircraft with which said system is designed for use.

According to another aspect to this invention, there is provided a method of servicing an aircraft with an aircraft servicing system comprising at least two robot arms, each of said robot arms of a type having a base mounted to the ground; a member mounted to said base by a yaw joint such that said member has an upstanding axis of rotation; a first arm segment joined to said member by a first pitch joint, said first pitch joint having an angular range sufficient to allow said first arm segment to make about a right angle with said axis of rotation of said member; a second arm segment joined to said first arm segment by a second pitch joint, said second pitch joint having an angular range which permits end-to-end alignment of said second arm segment with said first arm segment; a third arm segment joined to said second arm segment by a telescopic joint; an end effector joined to said third arm segment; said first pitch joint, said second pitch joint, and said telescopic joint providing one degree of redundancy such that, at least for some orientations of said robot arm, said end effector may be maintained at a point in space while said first arm segment, said second arm segment, and said third arm segment move; the base of each of said robot arms being mounted to the ground in spaced relation such that the bases form at least one pair of opposed bases defining a lane therebetween for permitting passage of aircraft, said lane having a width which is greater than any wheel span and engine span of an aircraft with which said system is designed for use and is narrower than a wing span of an aircraft with which said system is designed for use, comprising the steps of: indicating a type of aircraft to be serviced; causing the robot arms of a given pair of said at least one pair of opposed bases to assume a position lower than any wings of the type of aircraft to be serviced and toward a periphery of said lane; causing any remaining robot arms to assume a position which will not interfere with said aircraft; holding the robot arms in position while an aircraft to be serviced is moved forwardly over said given pair into a servicing position; and

BRIEF DESCRIPTION OF THE DRAWINGS

In the figures which disclose example embodiments of the invention.

DESCRIPTION OF THE PREFERRED EMBODIMENTS

Figure 1:
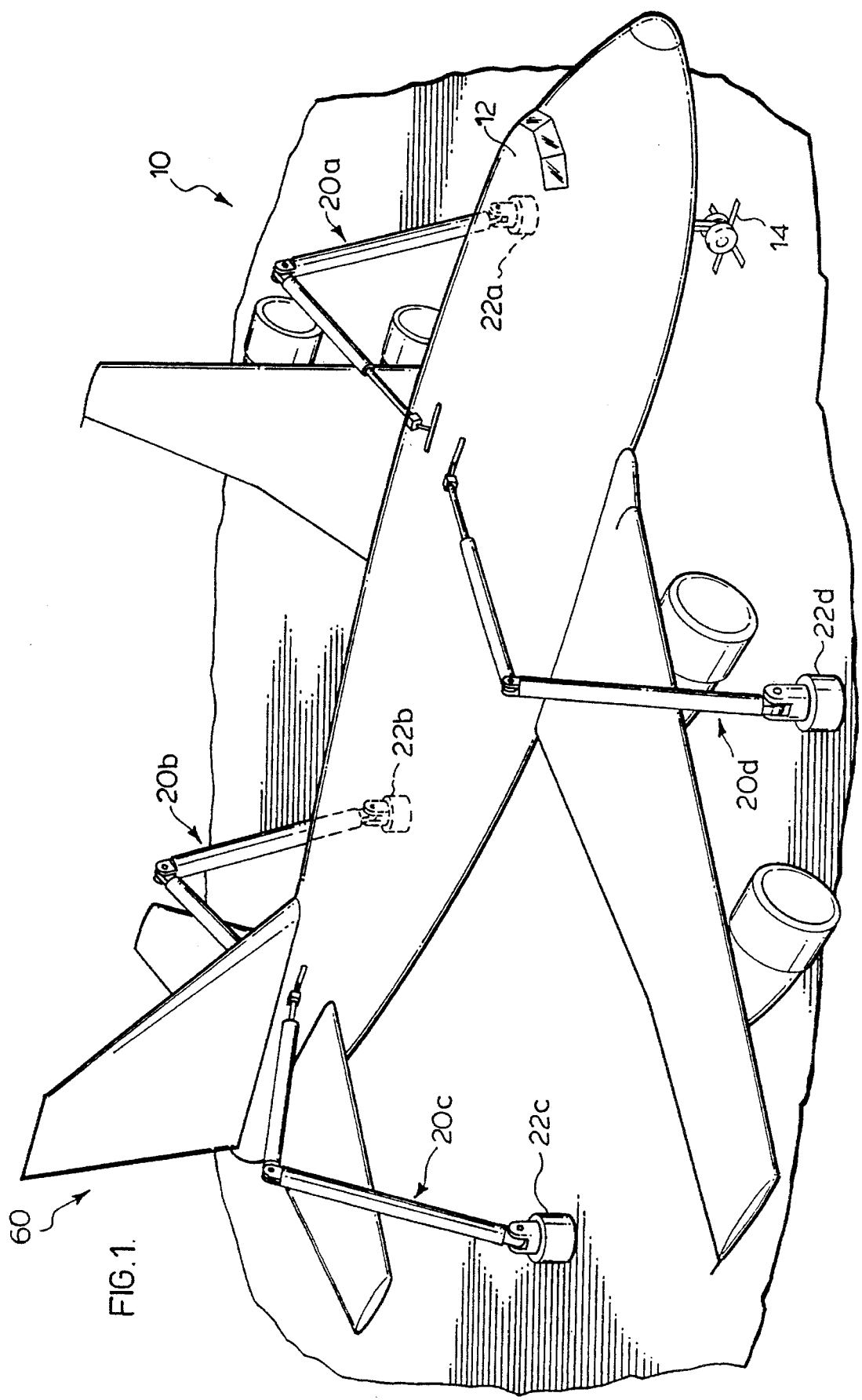
FIG. 1 is a perspective view of an aircraft servicing system made in accordance with this invention.

With reference to FIG. 1, an aircraft servicing system indicated generally at 10 for servicing an aircraft 12 comprises four robot arms 20a, 20b, 20c, and 20d. The system also has a stop mark 14.

Figure 2:
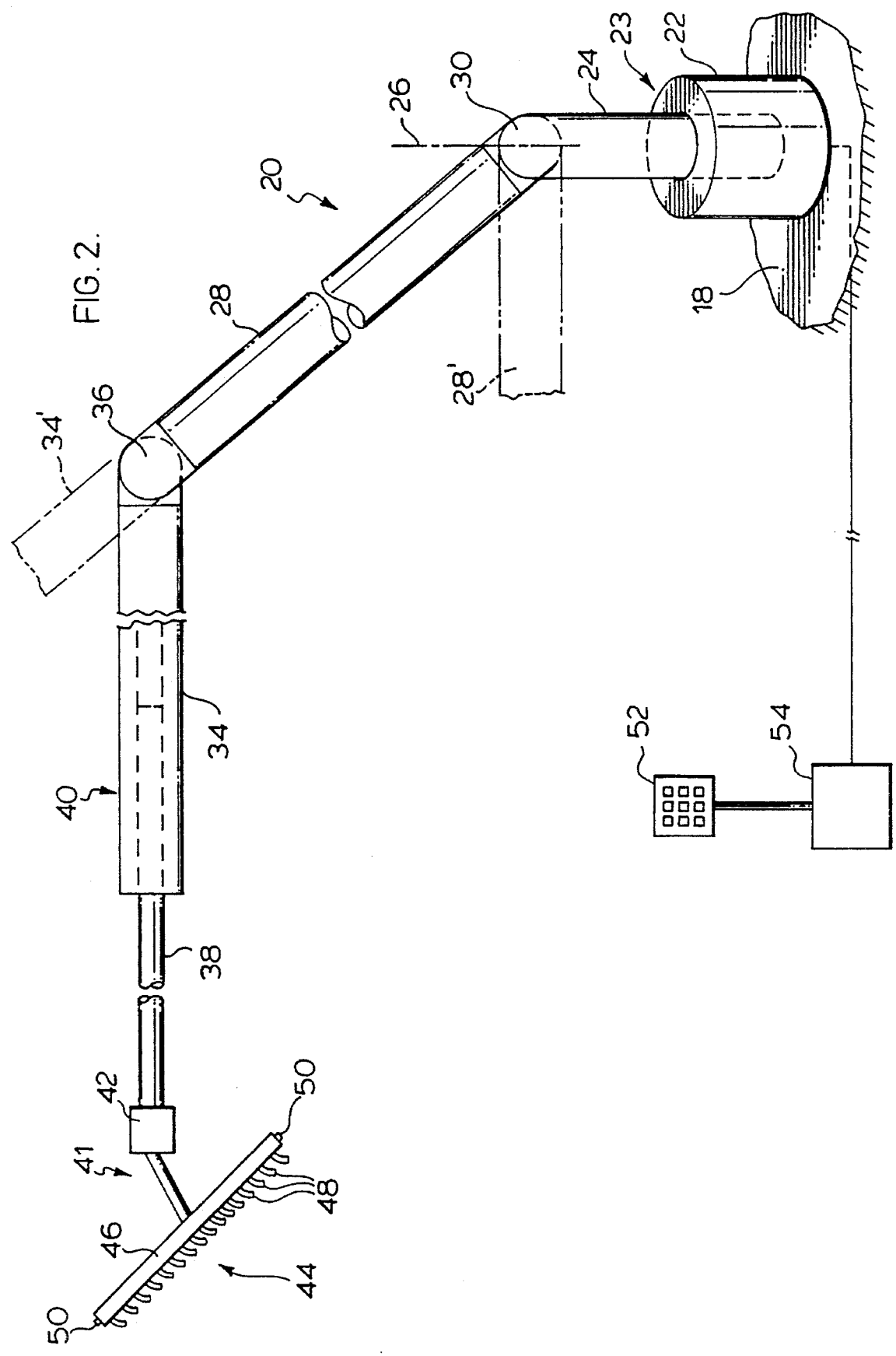
FIG. 2 is a perspective view of a robot arm made in accordance with this invention.

With reference to FIG. 2, each robot arm 20 comprises a base 22 which is mounted into the ground 18. The base supports an elongated member 24 for rotation about its upstanding longitudinal axis 26 thereby forming a yaw joint 23 with the base. A first arm segment 28 is pivotally joined to member 24 by a first pitch joint 30. A second arm segment 34 is pivotally joined to the first arm segment 28 by a second pitch joint 36. A third arm segment 38 is joined to the second arm segment 34 by a telescopic joint 40. The range of the first pitch joint 30 is sufficient to allow the first arm segment 28 to make about a right angle with the upstanding axis 26 of member 24, as is illustrated by the phantom first arm segment 28'. Furthermore, the second pitch joint 36 has an angular range sufficient to allow the second arm segment to be aligned end-to-end with the first arm segment, as illustrated by the phantom second arm segment 34'.

The third arm segment 38 terminates in an end effector 41 comprising a two degree of freedom wrist joint 42 with a nozzle array 44 joined thereto. The nozzle array 44 comprises an elongated support member 46 medially joined to the wrist joint 42. Nozzles 48 are rotatably mounted along the length of the elongated support member 46. A pair of end-fire nozzles 50 are fixed to either end of the elongated support member 46. The robot arm has a reach of on the order of 100 feet.

It will be noted that the joint configuration of the robot arm between base 22 and the end effector 41 provides one degree of redundancy for the robot arm. That is, with the centre of mass of the end effector 41 held stationary in three space, the elongated member 24, first arm segment 28, second arm segment 34 and third arm segment 38 retain some freedom of motion. The significance of this is that the robot arm may avoid awkward orientations, as will be described more fully hereinafter.

An operator keypad 52 is connected through a controller 54 to the joint actuators. These joint actuators, being conventional, are not shown nor further described. Furthermore, the arm has one of the several conventional mechanisms to provide feedback to the controller so that the controller may monitor actual arm position. As a feedback mechanism is conventional and within the skill of one skilled in the art, it is not shown nor further described.

Returning to FIG. 1, it will be noted that the bases 22a, 22b, 22c, 22d of the four robot arms are mounted to the ground in spaced relation so as to delineate a lane indicated at 60 with the bases 22a and 22b delineating one side of the lane and bases 22c and 22d delineating the other side of the lane. The lane is chosen to have a sufficient width to accommodate both the wheel span and engine span of all aircraft 12 intended to be used by the servicing system 10. Stop mark 14 is positioned toward the forward end of lane 60 medially between bases 22a and 22d. Since stop mark 14 is toward the forward end of the lane 60, it will be noted that robot arms 20a and 20d are mounted forwardly of robot arms 20b and 20c.

Figure 3:
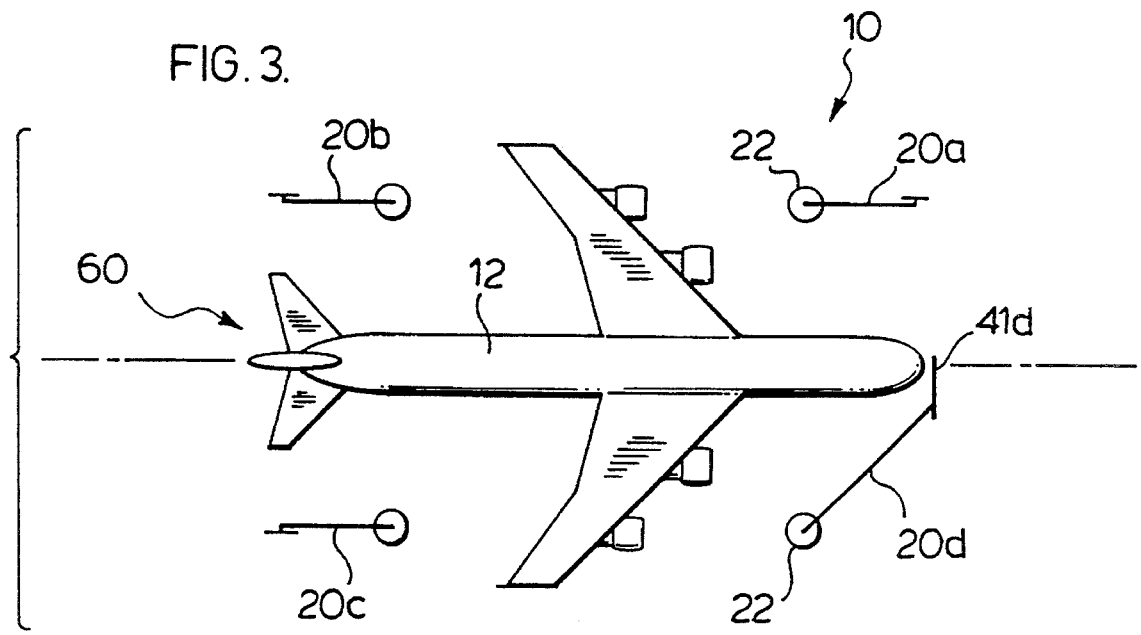
FIGS. 3 and 4 are schematic plan views of an aircraft servicing system made in accordance with this invention illustrating the operation of the system.

The operation of the aircraft de-icing system is described in conjunction with FIGS. 1 through 4. When a plane 12 is approaching the system 10, an operator keys in the type of aircraft which is approaching on keypad 52. Based on information stored in controller 54, the controller causes the more rearwardly positioned robot arms 20b and 20c assume a position lower than the wings of the aircraft which is to be serviced. More particularly, first arm segment 28 of these robot arms will move to approximately a right angle with the axis 26 of rotation of member 24, as illustrated by the phantom arm segment 28' in FIG. 2, and second arm segment 34 will move into approximately end-to-end alignment with first arm segment 28, as illustrated by the phantom arm segment 34' in FIG. 2. This position lower than the wings of an aircraft 12 may be considered a "lying down" position for the robot arms. Furthermore, yaw joint 23 of robot arms 20b and 20c is rotated so that arms 20b and 20c are positioned along the sides of lane 60 such that they will not interfere with the engines of aircraft 12 as it moves along the lane. This position for robot arms 20b and 20c as shown in FIG. 3. Conveniently, robot arm 20a will also assume this lying down position along the side of lane 60 as shown in FIG. 3, although the exact position of robot arm 20a is not as critical, provided it does not interfere with aircraft 12. Robot arm 20d is moved to a position as shown in FIG. 3 whereat its end effector 41d is positioned in lane 60 medially of the bases 22a and 22d and just forwardly of stop mark 14. End effector 41d is also positioned at the height of the cockpit of the aircraft 12. The robot arms are then held in this position as the aircraft 12 progresses along lane 60.

End effector 41d, being in the path of aircraft 12, is used to prompt the pilot to stop the aircraft in a position whereat end effector 41d is proximate the cockpit window, as seen in FIG. 3. In this position, the nose gear of aircraft 12 reaches stop mark 14. When the nose gear of the aircraft 12 reaches the stop mark 14, an indication is given to the system 10 that the aircraft 12 is in position. This indication may be generated by an aircraft sensor, a vision system, or simply by an operator. Accordingly, the robot arms may now begin de-icing of the aircraft, as illustrated in FIG. 1. In this connection, the robot arms 20a and 20d operate as mirror images of one another and spray de-icing fluid along the fuselage, wings, and, optionally, the engines and landing gear of the aircraft. The robot arms are programmed to spray at approximately a three foot stand-off from the aircraft. The rotatable joint nozzles 48 ensure the ability of each robot arm to spray in any desired direction.

The end effector 41 of each robot arm must move along a defined path dependent upon aircraft type and the areas of the aircraft chosen for spraying. The robot arm configuration must change to move the end effector appropriately. This could cause the arm to move through a singularity. A singularity is a point where a small change in the position of the end effector results in a large change in the configuration of the robot arm. Moving through a singularity is inefficient and wearing on the robot hardware. With each of the robot arms 20, singularities and other awkward arm configurations may be avoided by reason of the fact that the arm's joints provide one degree of redundancy. Thus, controller 54 may anticipate singularities and awkward configurations and reconfigure the robot arm segments to avoid these potential problems while the end effector continues on its desired path.

Every other nozzle 48 and one of the end-fire nozzles 50 may be connected to a hot de-icing fluid. The other nozzles 48 and nozzle 50 may be connected to an anti-icing fluid. An anti-icing fluid is unheated and prevents further icing.

Figure 4:
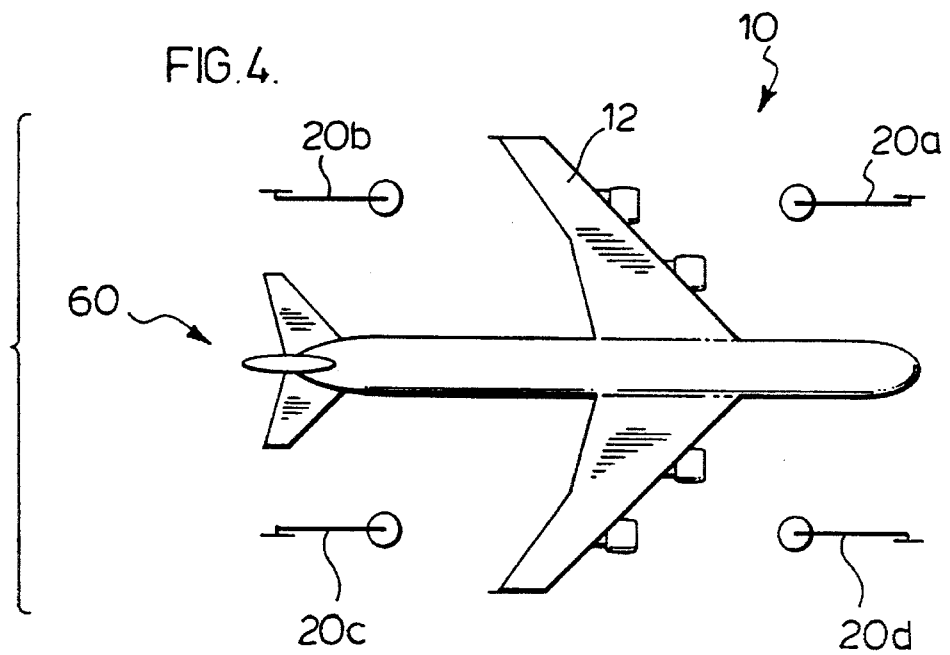

Once the system has completed its job, the forward robot arms 20a and 20d are caused to lie down along the edge of lane 60 and the rearward robot arms 20b and 20c may be similarly caused to lie down along the edge of lane 60, however, the exact position of the rearward robot arms is now not critical as long as they are out of the path of the rear portion of the aircraft. The system 10 with the robot arms laying down is shown in FIG. 4. The robot arms are held in this position while the aircraft 12 moves forwardly out of the lane 60.

Since the bases of the robot arms 20a, 20b, 20c, 20d are fixed in position and define a lane 60, excess glycol used in de-icing will, for the most part, fall from the aircraft onto lane 60. Thus, if drains are added to lane 60, most of this glycol may be recycled.

Where aircraft 12 has tail mounted engines, the operation of the system is identical except that the robot arms now must be positioned outside of the span of the wheels rather than the engines of the aircraft.

The servicing system 10 may also be used to wash aircraft by connecting the nozzles 48, 50 to a source of washing fluid rather than de-icing or anti-icing fluid. It will also be apparent that system 10 may be used for servicing other large structures, such as a dry docked ship. In such an application, system 10 could paint the hull of the ship by connecting the nozzles of the nozzle array 44 to a source of paint.

Other modifications will be apparent to those skilled in the art and, therefore, the invention is defined in the claims.

What is claimed is:

1. An aircraft spraying system, comprising a plurality of robot arms, each having:

a base mounted to the ground;

a member mounted to said base by a yaw joint such that said member has an upstanding axis of rotation;

a first arm segment joined to said member by a first pitch joint;

a second arm segment joined to said first arm segment by a second pitch joint;

a third arm segment joined to said second arm segment by a telescopic joint;

a nozzled end effector joined to said third arm segment;

said first pitch joint and said second pitch joint having angular ranges sufficient to allow said first arm segment, said second arm segment, said third arm segment, and said end effector to be positioned such that a wing of an aircraft to be sprayed may pass over said first arm segment, said second arm segment, said third arm segment, and said end effector;

whereby said first pitch joint, said second pitch joint, and said telescopic joint provide one degree of redundancy such that, at least for some orientations of said robot arm, said end effector may be maintained at a point in space while said first arm segment, said second arm segment, and said third arm segment move;

the base of each of said plurality of robot arms mounted to the ground in spaced relation from one another so as to provide an aircraft lane therebetween for permitting passage of aircraft with at least one base positioned to one side of said lane and at least one base positioned to another side of said lane, said lane having a width which is greater than any wheel span and engine span of an aircraft with which said system is designed for use and narrower than a wing span of an aircraft with which said system is designed for use.

2. The system of claim 1 wherein said end effector comprises a wrist joint having two degrees of freedom, said wrist joint supporting an array of nozzles.

3. An aircraft servicing system, comprising four robot arms, each of said robot arms having:

a base mounted to the ground;

a member mounted to said base by a yaw joint such that said member has an upstanding axis of rotation;

a first arm segment joined to said member by a first pitch joint, said first pitch joint having an angular range sufficient to allow said first arm segment to make about a right angle with said axis of rotation of said member;

a second arm segment joined to said first arm segment by a second pitch joint, said second pitch joint having an angular range which permits end-to-end alignment of said second arm segment with said first arm segment;

a third arm segment joined to said second arm segment by a telescopic joint;

an end effector joined to said third arm segment;

said first pitch joint, said second pitch joint, and said telescopic joint providing one degree of redundancy such that, at least for some orientations of said robot arm, said end effector may be maintained at a point in space while said first arm segment, said second arm segment, and said third arm segment move;

the base of each of said robot arms mounted to the ground in spaced relation from one another so as to delineate a lane therebetween for permitting passage of aircraft, with two of said bases positioned to one side of said lane and two of said bases positioned to another side of said lane, said lane having a width which is greater than any wheel span and engine span of an aircraft with which said system is designed for use and which is narrower than a wing span of an aircraft with which said system is designed for use.

4. The system of claim 3 wherein said end effector comprises a wrist joint having two degrees of freedom and an array of nozzles joined to said wrist joint.

5. A method of servicing an aircraft with an aircraft servicing system comprising at least two robot arms, each of said robot arms of a type having a base mounted to the ground; a member mounted to said base by a yaw joint such that said member has an upstanding axis of rotation; a first arm segment joined to said member by a first pitch joint, said first pitch joint having an angular range sufficient to allow said first arm segment to make about a right angle with said axis of rotation of said member; a second arm segment joined to said first arm segment by a second pitch joint, said second pitch joint having an angular range which permits end-to-end alignment of said second arm segment with said first arm segment; a third arm segment joined to said second arm segment by a telescopic joint; an end effector joined to said third arm segment; said first pitch joint, said second pitch joint, and said telescopic joint providing one degree of redundancy such that, at least for some orientations of said robot arm, said end effector may be maintained at a point in space while said first arm segment, said second arm segment, and said third arm segment move; the base of each of said robot arms being mounted to the ground in spaced relation such that the bases form at least one pair of opposed bases defining a lane therebetween for permitting passage of aircraft, said lane having a width which is greater than any wheel span and engine span of an aircraft with which said system is designed for use and is narrower than a wing span of an aircraft with which said system is designed for use, comprising the steps of:

indicating a type of aircraft to be serviced;

causing the robot arms of a given pair of said at least one pair of opposed bases to assume a position lower than any wings of the type of aircraft to be serviced and toward a periphery of said lane;

causing any remaining robot arms to assume a position which will not interfere with said aircraft;

holding the robot arms in position while an aircraft to be serviced is moved forwardly over said given pair into a servicing position; and servicing said aircraft with said robot arms.

6. The method of claim 5 wherein said at least two robot arms comprise four robot arms with the base of each of said robot arms being mounted to the ground in spaced relation such that the bases form a more forwardly positioned pair of opposed bases and a more rearwardly positioned pair of opposed bases defining said lane and wherein the step of causing said given pair to assume a position comprises causing the robot arms comprising the more rearwardly positioned bases to assume a position lower than any wings of the type of aircraft to be serviced and toward a periphery of said lane.

7. The method of claim 6 including the steps of, after the step of servicing said aircraft:

causing the robot arms comprising the more forwardly positioned bases to assume a position lower than the wings of said aircraft and toward a periphery of said lane;

causing the robot arms comprising the more rearwardly positioned bases to assume a position which will not interfere with said aircraft; and holding the robot arms in position until said aircraft has moved forwardly out of said lane.

8. The method of claim 6 wherein said aircraft has a cockpit at a certain height above ground level and a nose and including the step of causing one of the robot arms comprising one of the more forwardly positioned bases to assume a position whereat its end effector is positioned in said lane at approximately the height of the cockpit of the aircraft with which the system is intended to be used and holding said one of said robot arms in position until an aircraft to be serviced is moved forwardly into said lane with its nose proximate said end effector positioned in said lane, said servicing position being defined by said nose being proximate said end effector in said lane.

9. The method of claim 8 including the steps of, after the step of servicing said aircraft:

causing the robot arms comprising the more forwardly positioned bases to assume a position lower than the wings of said aircraft and toward a periphery of said lane;

causing the robot arms comprising the more rearwardly positioned bases to assume a position which will not interfere with said aircraft;

holding the robot arms in position until said aircraft has moved forwardly out of said lane.

\* \* \* \* \*